C. W. LOLLER.
MILK-COOLERS.

No. 193,716. Patented July 31, 1877.

WITNESSES:
Francis McArdle.
J. H. Scarborough.

INVENTOR:
C. W. Loller.
BY
ATTORNEYS.

UNITED STATES PATENT OFFICE.

CHARLES W. LOLLER, OF UNIONVILLE, PENNSYLVANIA.

IMPROVEMENT IN MILK-COOLERS.

Specification forming part of Letters Patent No. 193,716, dated July 31, 1877; application filed June 30, 1877.

*To all whom it may concern:*

Figure 1:
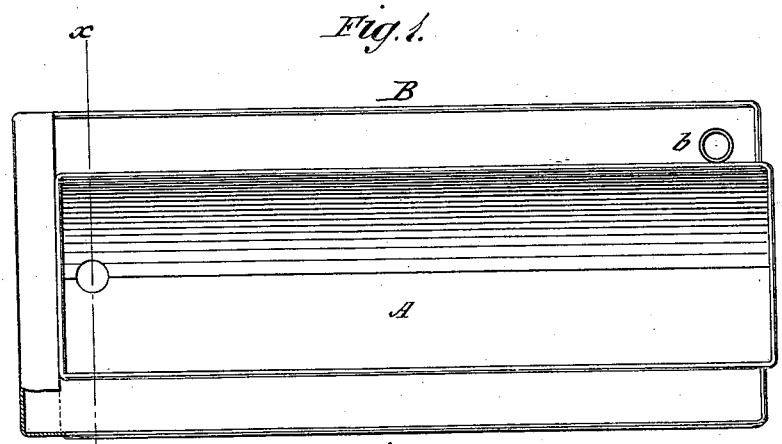
Figure 2:
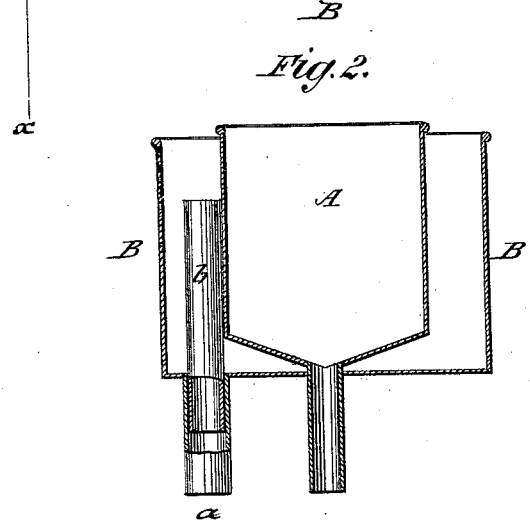

Be it known that I, CHARLES W. LOLLER, of Unionville, in the county of Chester and State of Pennsylvania, have invented a new and Improved Milk-Cooler, of which the following is a specification:

In the accompanying drawings, Figure 1 represents a top view, and Fig. 2 a vertical transverse section on line $x\,x$, Fig. 1, of my improved milk-cooler.

Similar letters of reference indicate corresponding parts.

This invention has reference to a milk-cooler that admits the action of the cooling medium on the bottom and sides of the pan, together with an adjustment of the level of the water to the level of the milk in the pan.

The invention consists of a milk-pan with bottom inclined from the sides toward the center line. The pan is set into and connected to an inclosing water-tank, having adjustable exit-pipe to regulate level of water in the same.

In the drawing, A represents the milk-pan, which is of suitable size, and surrounded by a water receptacle or vat, B, to which it is attached at one of the shorter ends, leaving a space that extends from one corner of the pan around the longer side and opposite end, and back along the opposite longer side to the shorter end wall.

The cold water enters at one corner, and passes around the pan in the surrounding space described to an exit-pipe, $a$, at the opposite corner, its level being controlled by a vertically-sliding pipe, $b$, to correspond to the level of the milk in the pan A.

The bottom of the pan A is made dishing by being inclined at a suitable angle from the longer sides to the center line of the pan. This produces triangular spaces between the bottom of pan and vat, as shown in Fig. 2, into which the cold water may enter, so that the bottom of the milk-pan is cooled off in the same manner as the sides.

The connection of pan and vat forms a connected cooler that is conveniently handled.

The vat may be readily cleaned by taking out the sliding tube, and the milk drawn off from the pan by an exit-pipe and suitable stopper, in the customary manner.

Having thus described my invention, I claim as new and desire to secure by Letters Patent—

A milk-cooler constructed of a milk-pan, A, having a bottom inclined from the longer sides to the center line, and of a vat, B, which is attached to one of the shorter ends of the pan, and extended to form a space around the remaining side and bottom, for effective cooling of the milk, substantially in the manner and for the purpose set forth.

CHARLES W. LOLLER.

Witnesses:
WM. R. CHAMBER,
JOHN H. MARSHALL.